United States Patent
Chen

(10) Patent No.: US 11,656,321 B2
(45) Date of Patent: May 23, 2023

(54) METHOD OF MICROWAVE MOTION DETECTION WITH ADAPTIVE FREQUENCY CONTROL AND RELATED DEVICES

(71) Applicant: RichWave Technology Corp., Taipei (TW)

(72) Inventor: Tse-Peng Chen, Taipei (TW)

(73) Assignee: RichWave Technology Corp., Taipei (TW)

( * ) Notice: Subject to any disclaimer, the term of this patent is extended or adjusted under 35 U.S.C. 154(b) by 397 days.

(21) Appl. No.: 16/453,984

(22) Filed: Jun. 26, 2019

(65) Prior Publication Data

US 2020/0025867 A1 Jan. 23, 2020

Related U.S. Application Data

(60) Provisional application No. 62/701,850, filed on Jul. 23, 2018.

(51) Int. Cl.
  *G01S 7/02* (2006.01)
  *G01S 13/56* (2006.01)
(52) U.S. Cl.
  CPC .............. *G01S 7/023* (2013.01); *G01S 7/0232* (2021.05); *G01S 13/56* (2013.01)
(58) Field of Classification Search
  CPC ............ G01S 7/023; G01S 13/56; G01S 7/36; H04K 3/226
  USPC .......................................................... 342/18
  See application file for complete search history.

(56) References Cited

U.S. PATENT DOCUMENTS 5,168,215 A * 12/1992 Puzzo .................... G01S 7/021
                                                              367/90
5,280,288 A *  1/1994 Sherry .................... G01S 7/023
                                                              342/159
5,682,164 A * 10/1997 McEwan ................. G01S 13/56
                                                              342/28

(Continued)

FOREIGN PATENT DOCUMENTS

TW         200848766         12/2008
TW         I514193 B         12/2015

(Continued)

*Primary Examiner* — Erin F Heard
*Assistant Examiner* — Juliana Cross
(74) *Attorney, Agent, or Firm* — Winston Hsu

(57) ABSTRACT

A method of microwave motion detection with adaptive frequency control, for a microwave motion sensor, comprises suppressing output of the first detecting signal generated with a first frequency, determining whether a first interference signal is detected in the first frequency during the suppressing, responsive to that the first interference signal is detected in the first frequency, generating a second detecting signal with a second frequency, which is different from the first frequency, and suppressing output of the second detecting signal, determining whether a second interference signal is detected in the second frequency during the suppressing, and responsive to that the second interference signal is not detected in the second frequency, outputting the second detecting signal for motion detection. The microwave motion sensor is operated in a normal mode or in a detection mode according to the first detecting signal, a reflected signal, the second detecting signal and an interference signal.

9 Claims, 16 Drawing Sheets

(56) References Cited

U.S. PATENT DOCUMENTS

| | | | | |
|---|---|---|---|---|
| 6,426,716 | B1* | 7/2002 | McEwan | G01S 13/04 342/28 |
| 6,888,491 | B2* | 5/2005 | Richter | G01S 13/22 342/159 |
| 9,229,102 | B1* | 1/2016 | Wright | G01S 13/887 |
| 2002/0130811 | A1* | 9/2002 | Voigtlaender | G01S 7/023 342/162 |
| 2004/0095269 | A1* | 5/2004 | Uehara | G01S 7/023 342/159 |
| 2007/0120731 | A1* | 5/2007 | Kelly | G01S 7/36 342/159 |
| 2007/0171122 | A1* | 7/2007 | Nakano | G01S 7/4021 342/91 |
| 2007/0188373 | A1* | 8/2007 | Shirakawa | H01Q 21/0075 342/159 |
| 2008/0094274 | A1* | 4/2008 | Nakanishi | G01S 7/354 342/91 |
| 2008/0100493 | A1* | 5/2008 | Akita | G01S 13/26 342/20 |
| 2008/0165059 | A1 | 7/2008 | Karr | |
| 2010/0253573 | A1* | 10/2010 | Holzheimer | G01S 7/40 342/176 |
| 2014/0266853 | A1* | 9/2014 | Orr | G01S 7/04 342/20 |
| 2015/0070204 | A1* | 3/2015 | Shirakawa | G01S 7/0235 342/128 |
| 2015/0260828 | A1* | 9/2015 | Ossowska | G01S 13/931 342/162 |
| 2015/0378005 | A1* | 12/2015 | Kojima | G01S 7/04 342/16 |
| 2017/0059691 | A1* | 3/2017 | Fischer | G01F 23/284 |
| 2017/0171791 | A1* | 6/2017 | Li | H04W 36/06 |
| 2017/0219690 | A1* | 8/2017 | Farhoud | G01S 13/34 |
| 2017/0285136 | A1* | 10/2017 | Hesse | G01S 7/023 |
| 2018/0180714 | A1* | 6/2018 | Zur | H04K 3/822 |
| 2019/0195985 | A1* | 6/2019 | Lin | G01S 7/40 |
| 2020/0150218 | A1* | 5/2020 | Dechant | G01S 7/038 |
| 2021/0255275 | A1* | 8/2021 | Gao | H04W 72/0453 |

FOREIGN PATENT DOCUMENTS

| | | | |
|---|---|---|---|
| TW | 201636638 A | 10/2016 | |
| WO | WO-2016170005 A1 * | 10/2016 | ........... A61B 5/0205 |
| WO | WO-2016170007 A1 * | 10/2016 | ........... A61B 5/0017 |
| WO | 2018/033574 A1 | 2/2018 | |

* cited by examiner

METHOD OF MICROWAVE MOTION DETECTION WITH ADAPTIVE FREQUENCY CONTROL AND RELATED DEVICES

CROSS REFERENCE TO RELATED APPLICATION

This application claims the benefit of U.S. Provisional Application No. 62/701,850, filed on Jul. 23, 2018 and entitled "Adaptive frequency control for Microwave Motion sensor", the contents of which are incorporated herein in their entirety.

TECHNICAL FIELD

The present invention relates to a method of motion detection, and more particularly, to a method of microwave motion detection with adaptive frequency control.

BACKGROUND

Motion sensors are one of the best ways to secure home. Protecting entryways is one way to ensure that your home is safe, but if someone does manage to breach your exterior security, you also want to know whether people are moving inside of your house. Motion sensors can be used that have radar, photo-sensors, or infrared motion detectors. The simplest motion sensors apply radar or microwave technology.

Conventional microwave motion sensor uses electromagnetic radiation. It emits waves which are then reflected back to the receiver. The receiver analyzes the waves that are bounced back. If there is an object moving in the room, these waves are going to be altered. The microwave motion sensor is able to identify changes from moment to moment.

Microwave motion sensor can be programmed in a way to reduce the amount of false alarms without having to reduce the number of correct positives, therefore improving accuracy while also improving upon ease of use. However, they do have a number of false alarms, as things such as drapery moving could potentially cause problems. In addition, any electronic device equipped with a radio spectrum as the same as the microwave motion sensor does may affect motion detection. That is, the waves (hereafter called detecting signal) emitted from the microwave motion sensor is in the same frequency as the electronic device is, so the receiver of the microwave motion sensor may receive the reflecting signal and an interference signal from the electronic device. Thus, it causes false alarm. In this case, the user may place the electronic device away from the microwave motion sensor. However, it may not practical due to limited space.

Besides, many electronic devices today are equipped with Wi-Fi technology. For example, the microwave motion sensor and a WIFI device are integrated in one device. Thus, it is impossible to avoid interference during the motion detection.

SUMMARY

It is therefore an objective to provide a method of microwave motion detection with adaptive frequency control for avoiding interference to solve the above problem.

The present invention discloses a method of microwave motion detection with adaptive frequency control, for a microwave motion sensor. The method comprises suppressing output of a first detecting signal for motion detection, wherein the first detecting signal is generated with a first frequency; determining whether a first interference signal is detected in the first frequency during the suppressing output of the first detecting signal; responsive to that the first interference signal is detected in the first frequency during the suppressing output of the first detecting signal, generating a second detecting signal with a second frequency, which is different from the first frequency, and suppressing output of the second detecting signal; determining whether a second interference signal is detected in the second frequency during the suppressing output of the second detecting signal; and responsive to that the second interference signal is not detected in the second frequency, outputting the second detecting signal for motion detection.

The present invention further discloses a microwave motion sensor with adaptive frequency control, wherein the microwave motion sensor is operated in a normal mode or in a detection mode. The microwave motion sensor comprises an oscillator, for generating a first detecting signal with a first frequency in the normal mode, and generating a second detecting signal with a second frequency in the detection mode, wherein the second frequency is different to the first frequency; a transmission amplifier, coupled to the oscillator, for amplifying the first detecting signal and outputting the amplified first detecting signal for motion detection in the normal mode, and suppressing output of the first detecting signal in the detection mode; a mixer, coupled to the oscillator, for generating a first mixing signal according to the first detecting signal and a reflected signal in the normal mode, wherein the reflected signal is due to a motion event of an object and is related to the first detecting signal, and generating a second mixing signal according to the generated first detecting signal and an interference signal in the detection mode; and a detector, coupled to the mixer and the oscillator, for switching the microwave motion sensor between the normal mode and the detection mode according to the first mixing signal and the second mixing signal.

DETAILED DESCRIPTION

Figure 1:
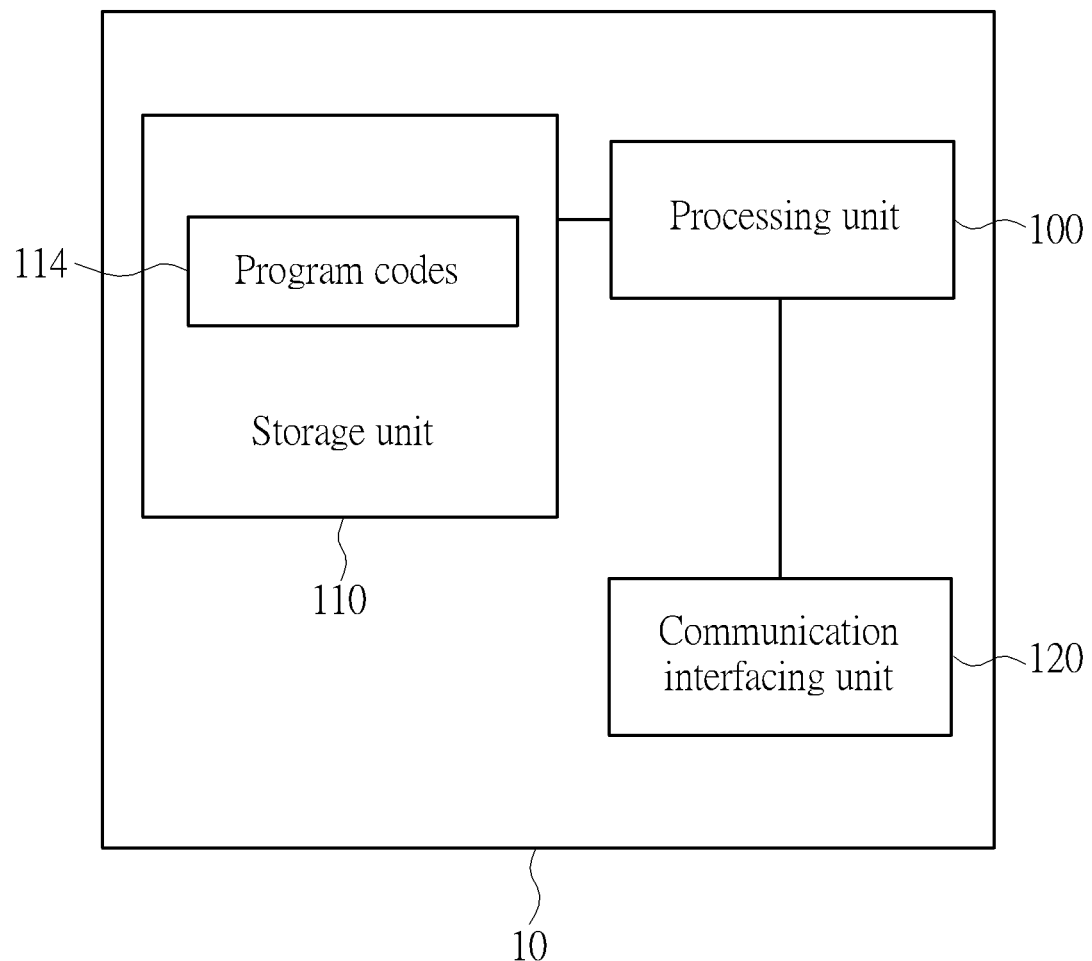
FIG. 1 is a schematic diagram of a microwave motion sensor according to an embodiment of the present disclosure.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Reference is made to FIG. 1, which is a schematic diagram of an exemplary microwave motion sensor 10. The microwave motion sensor 10 may include a processing unit 100 such as a microprocessor or Application Specific Integrated Circuit (ASIC), a storage unit 110 and a communication interfacing unit 120. The storage unit 110 may be any data storage device that can store program code 114, for access by the processing unit 100. Examples of the storage unit 110 include but are not limited to a subscriber identity module (SIM), read-only memory (ROM), flash memory, random-access memory (RAM), CD-ROMs, magnetic tape, hard disk, and optical data storage device. The communication interfacing unit 120 is preferably a radio transceiver and can exchange wireless signals according to processing results of the processing unit 100.

Figure 2:
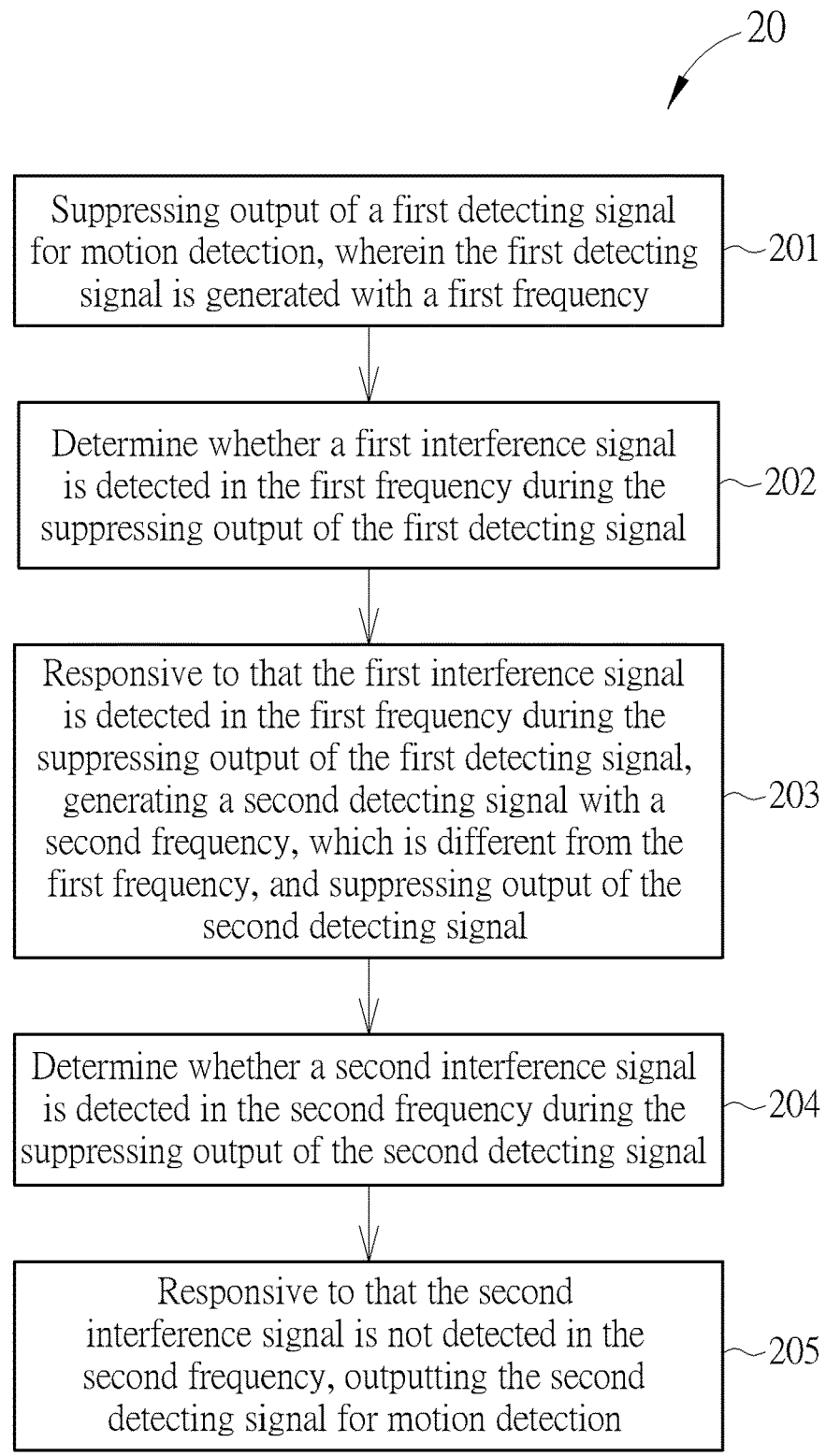
FIG. 2 is a flowchart of an exemplary process according to an embodiment of the present disclosure.
Figure 3:
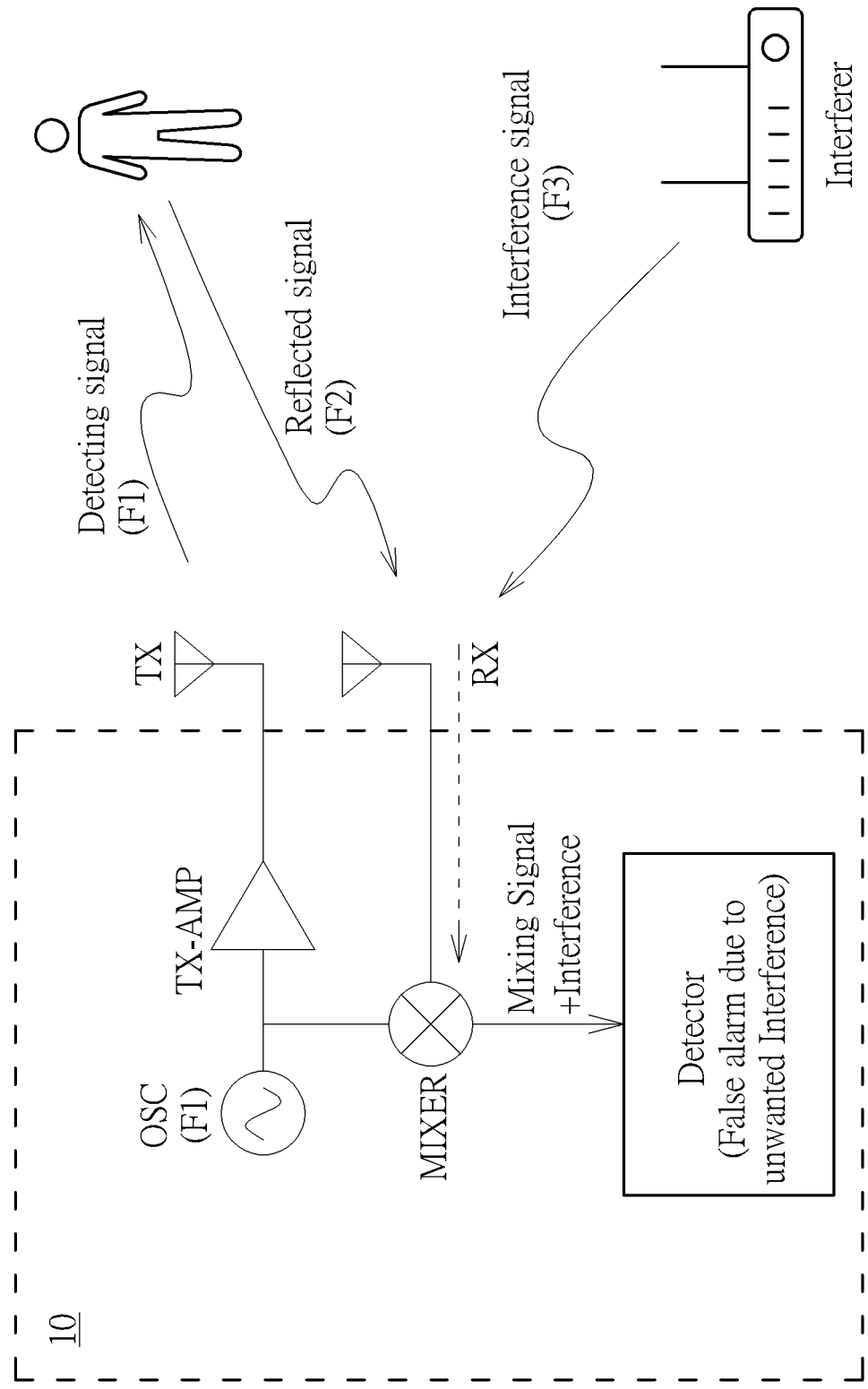
FIG. 3-6 are schematic diagrams of an operation of a microwave motion sensor according to an embodiment of the present disclosure.

Reference is made to FIG. 2, which is a flowchart of motion detecting process 20 according to an example of the present disclosure. The motion detecting process 20 is utilized in the microwave motion sensor 10 of FIG. 1, and may be compiled into a program code 114 to be stored in the storage unit 110, and may include the following steps:

Step 201: Suppressing output of a first detecting signal for motion detection, wherein the first detecting signal is generated with a first frequency.

Step 202: Determine whether a first interference signal is detected in the first frequency during the suppressing output of the first detecting signal.

Step 203: Responsive to that the first interference signal is detected in the first frequency during the suppressing output of the first detecting signal, generating a second detecting signal with a second frequency, which is different from the first frequency, and suppressing output of the second detecting signal.

Step 204: Determine whether a second interference signal is detected in the second frequency during the suppressing output of the second detecting signal.

Step 205: Responsive to that the second interference signal is not detected in the second frequency, outputting the second detecting signal for motion detection.

According to the motion detecting process 20, the microwave motion sensor 10 changes the frequency of the detecting signal (i.e. from the first frequency to the second frequency) for motion detecting when an unwanted interference signal, i.e. from a WIFI device or another microwave motion sensor is detected, to avoid interference occurs during motion detection. In a word, the microwave motion sensor 10 is applied with adaptive frequency control, so as to reduce false alarm due to unwanted interference.

FIGS. 3-6 illustrate practical object motion detecting operation of the microwave motion sensor 10. The microwave motion sensor 10 is operated in the normal mode or in the detection mode. The microwave motion sensor 10 includes the oscillator OSC, the transmission amplifier TX-AMP the mixer and the detector. In the embodiment, the transmission amplifier TX-AMP is coupled to a transmitter TX through a transmission node of the microwave motion sensor 10, and the mixer is coupled to a receiver RX through a receiver node of the microwave motion sensor 10. In other embodiment, the microwave motion sensor 10 could further include the transmitter TX and the receiver RX. In the normal mode of object motion detecting operation shown in FIG. 3, the oscillator OSC generates the oscillation signal as the detecting signal with the oscillation frequency F1. The transmission amplifier TX-AMP could be switched to an amplification mode to amplify the detecting signal and outputs the detecting signal being amplified to the transmitter TX. In other words, the transmission amplifier TX-AMP could be switched to the amplification mode to amplify the detecting signal by increasing the gain of the transmission amplifier TX-AMP, starting or turning on the transmission amplifier TX-AMP, or switching the amplified detecting signal from the ground to the transmitter TX, etc. In one embodiment, the transmission amplifier TX-AMP could amplify the detecting signal by mixing another oscillation signal having a frequency different with the oscillation frequency F1. The transmitter TX emits the amplified detecting signal with the oscillation frequency F1 for detecting object motion. That is, the detecting signal is amplified by the transmission amplifier TX-AMP and then emitted by the transmitter TX. Normally, the mixer generates the mixing signal according to the received detecting signal with the oscillation frequency F1 and the reflected signal with frequency F2 received from the receiver RX, wherein the reflected signal is generated by reflecting the emitted detecting signal from the object. The frequency F2 could be near to the frequency F1 and have a tiny frequency shift due to a motion event of the object. However, the receiver RX may receive the interference signal with the frequency F3 substantially equal to the frequency F1 or F2, and thus the mixing signal includes interference component. The detector determines whether a motion event happens based on the strength of the mixing signal with a predetermined threshold. For example, if the strength of the mixing signal is greater than the predetermined threshold, the detector determines the motion event is happened. On the other hand, if the strength of the mixing signal is smaller than the predetermined threshold, the detector determines no motion event is happened. However, as abovementioned, due to the mixing signal may include unexpected interference signal with frequency F3, the detector may determine that the motion event occurs, which causes false alarm. In this case, the detector is configured for switching the microwave motion sensor 10 between the normal mode and the detection mode.

Figure 4:
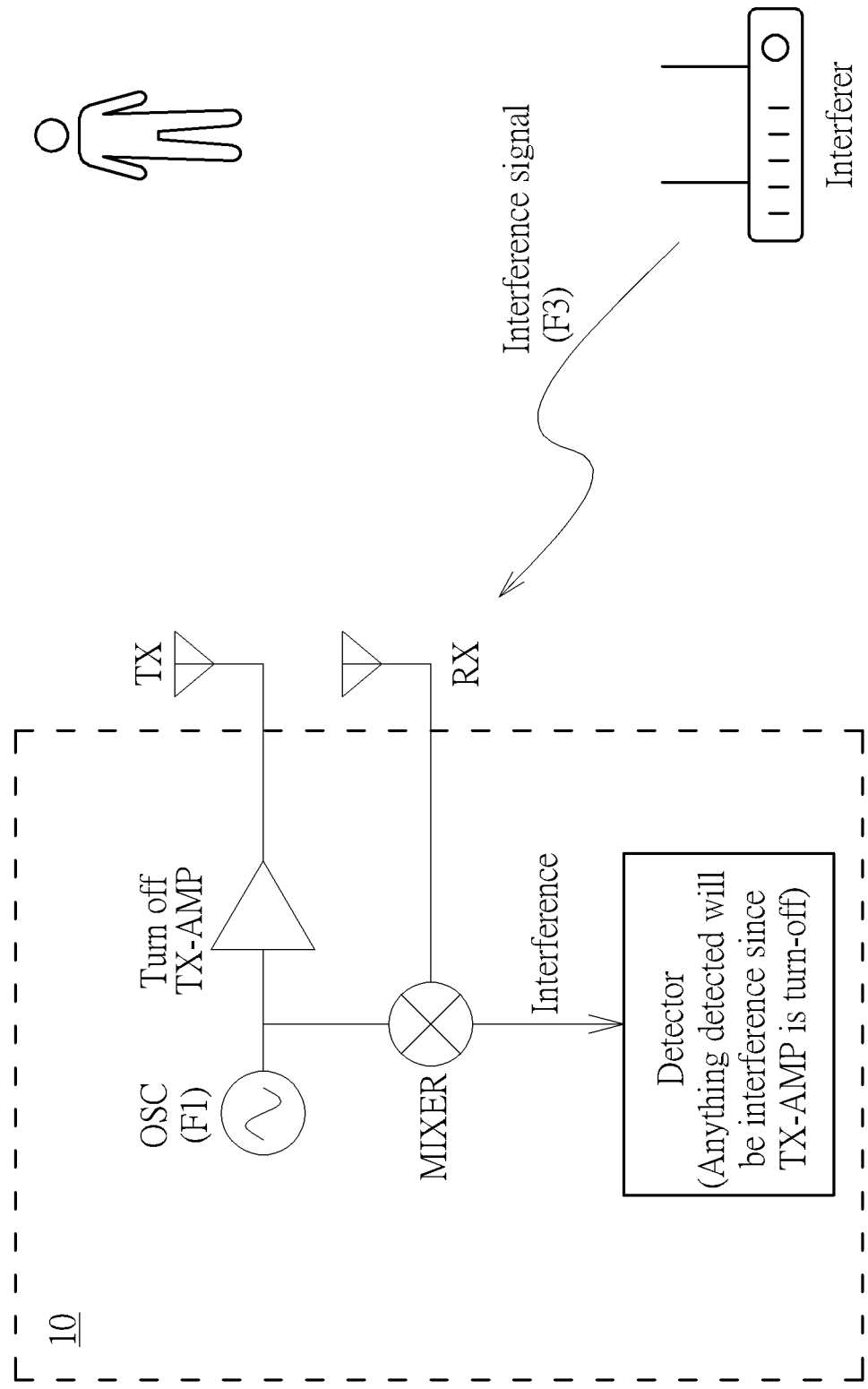

In the detection mode of FIG. 4, the transmission amplifier TX-AMP suppresses output of the detecting signal with the oscillation frequency F1. In other words, the transmission amplifier TX-AMP could be switched to a suppression mode to suppress output of the detecting signal by reducing the gain of the transmission amplifier TX-AMP, stopping or turning off the transmission amplifier TX-AMP, attenuating or not outputting the detecting signal, or shunting the detecting signal to the ground, etc. Thus, the transmitter TX emits insufficient detecting signal for detecting object motion, such as the transmitter TX emits no detecting signal. Note that, since insufficient detecting signal is emitted, there is also insufficient reflected signal should be received by the receiver RX, such as no reflected signal should be received by the receiver RX. Therefore, any signal with the frequency F3 substantially equal to the frequency F1 or F2 received by the receiver RX is considered as the interference signal of the interferer, such as a WIFI router or another microwave motion sensor. In this case, the detector determines whether the strength of the mixing signal is greater than the predetermined threshold or not. If the mixing signal is smaller than the predetermined threshold, the detector determines that there is no interference and thus switching the microwave motion sensor 10 from the detection mode back to the normal mode. That is, the oscillator OSC generates the oscillation signal as the detecting signal with the oscillation frequency F1, the transmission amplifier TX-AMP amplifies the detecting signal with the oscillation frequency F1 and outputs the detecting signal to the transmitter TX, and the transmitter TX emits the amplified detecting signal with the oscillation frequency F1 for detecting object motion.

Figure 5:
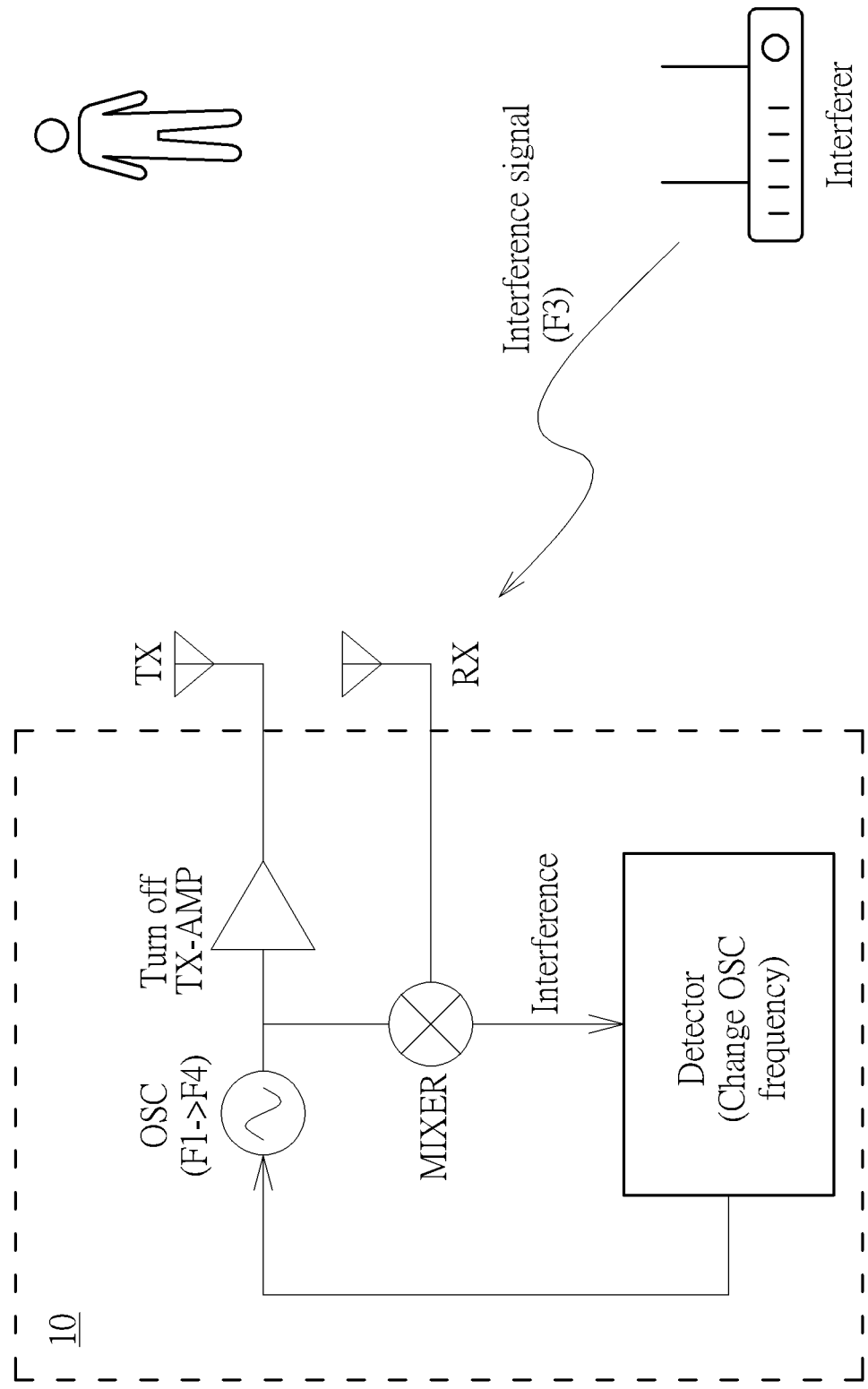
Figure 6:
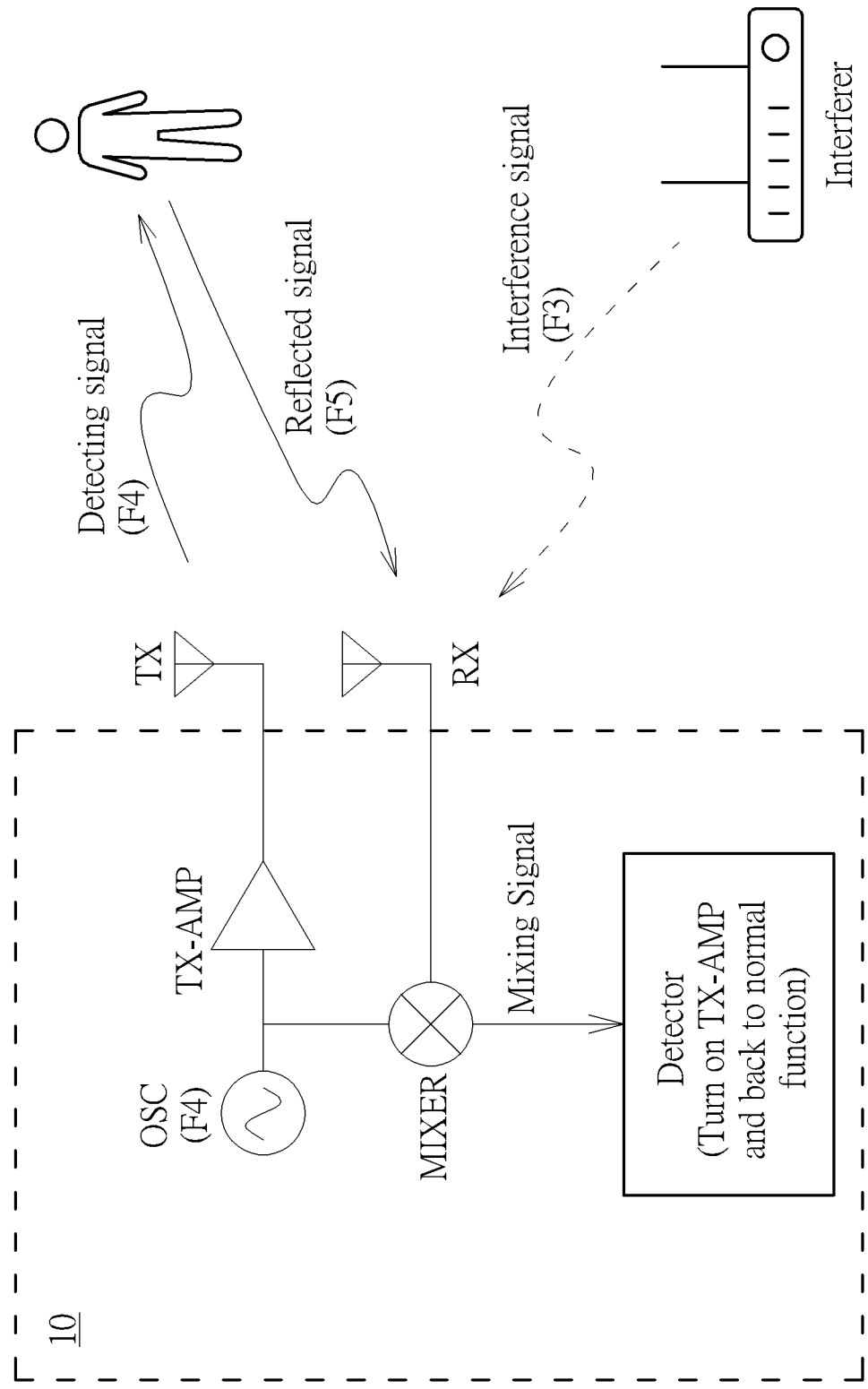

On the other hand, if the mixing signal is greater than the predetermined threshold, the detector determines that the interference signal is detected, and then controls the oscillator OSC to generate the oscillation signal with the oscillation frequency F4 which is different from the frequency F1, as shown in FIG. 5. Therefore, the interference signal with the frequency F3 substantially equal to the frequency F1 or F2 may not be received by the receiver RX and not be detected. Meanwhile, the transmission amplifier TX-AMP suppresses output of the detecting signal with the oscillation frequency F4, whereas the detector determines whether the interference occurs within the oscillation frequency F4 by comparing the strength of the mixing signal with the predetermined threshold. If no interference signal is detected at the oscillation frequency F4, the detector then switches the microwave motion sensor 10 from the detection mode back to the normal mode, as shown in FIG. 6. Consequently, the oscillator OSC generates the oscillation signal as the detecting signal with the oscillation frequency F4, and the transmission amplifier TX-AMP amplifies the detecting signal with the oscillation frequency F4 for the transmitter TX to emit the detecting signal with the oscillation frequency F4 for detecting object motion. Otherwise, the detector further controls the oscillator OSC to change the oscillation signal with different frequencies until no interference signal is detected.

Figure 7:
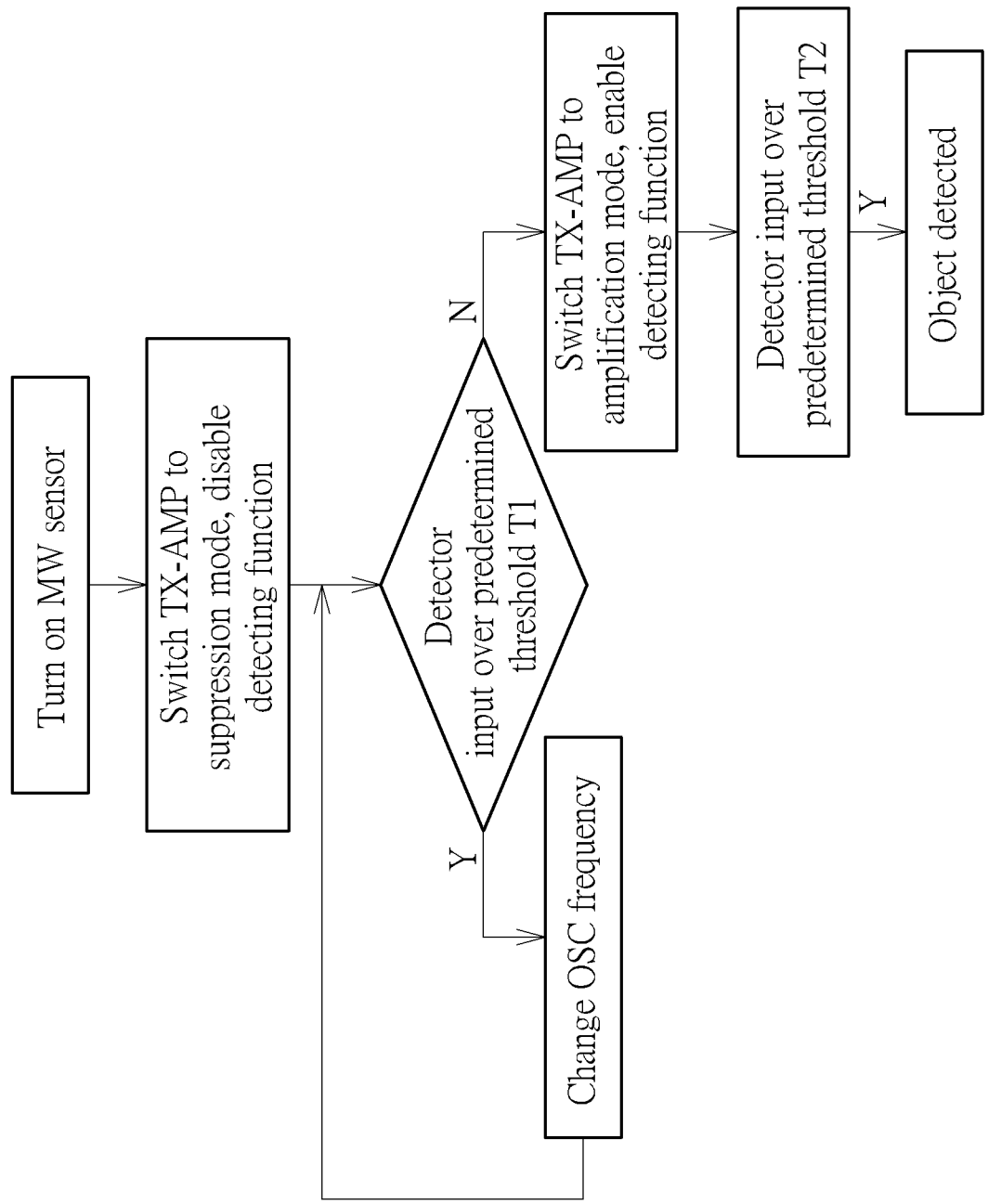
FIGS. 7-8 are flowchart of an operation of a microwave motion sensor according to an embodiment of the present disclosure.
Figure 8:
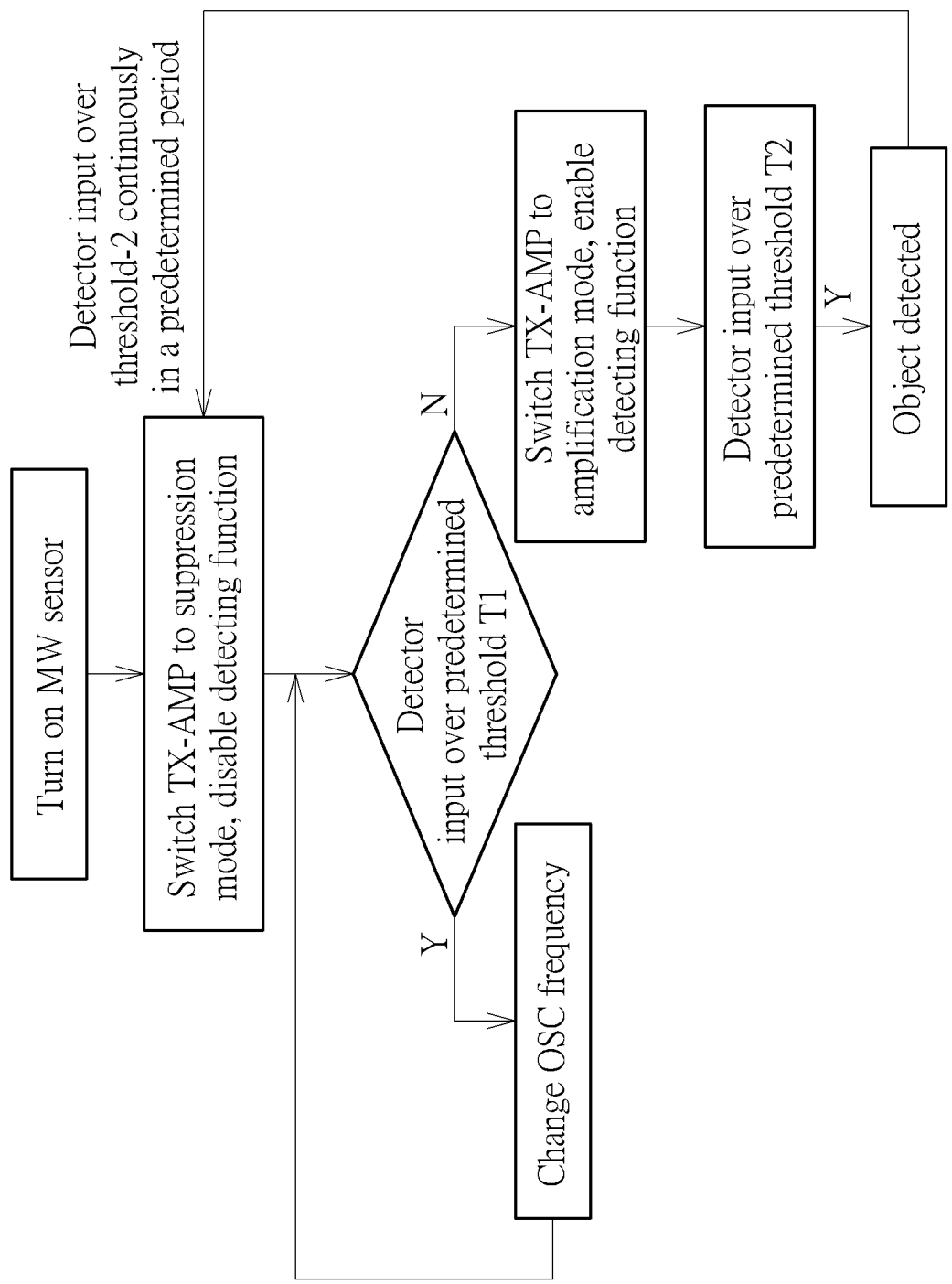

Operation of the microwave motion sensor 10 could be summarized into the motion detection flow as shown in FIGS. 7-8. In FIG. 7, the microwave motion sensor 10 is turned on and initially operated in the normal mode. Before starting the object motion detecting function, the detector switches the microwave motion sensor 10 to the detection mode, and thus the transmission amplifier TX-AMP suppresses the detecting signal. In other words, the transmission amplifier TX-AMP is switched to the suppression mode aforesaid or the object motion detecting function of the microwave motion sensor 10 is disable. In the detection mode, if the strength of the mixing signal inputted into the detector is over the predetermined threshold T1, the detector controls the oscillator OSC to change the frequency of the oscillation signal (i.e. from the oscillation frequency F1 to the oscillation frequency F4 as shown in FIG. 5). If the strength of the mixing signal inputted into the detector is not over the predetermined threshold T1, the detector 106 switches the microwave motion sensor 10 back to the normal mode. Thus, the transmission amplifier TX-AMP is started and switched to the amplification mode aforesaid, namely the object motion detecting function of the microwave motion sensor 10 is enable. In the normal mode, if the strength of the mixing signal inputted into the detector is over the predetermined threshold T2, the detector determines that an object is detected. Otherwise, the detector determines that no object is detected.

Reference is made to FIG. 8. The detector switches the microwave motion sensor 10 from the normal mode to the detection mode, to suppress the output of the transmission amplifier TX-AMP or the object motion detecting function of the microwave motion sensor 10 is disable when the detector continuously determines that the object is detected in a predetermined time (i.e. the strength of the mixing signal inputted into the detector is continuously greater than the predetermined threshold T2 in a time period).

In an embodiment, the oscillator OSC is operated as a free-running oscillator, namely operated in a target frequency with frequency drift, to generate the oscillation signal with different frequencies by a predetermined frequency step, or with a set of predetermined frequency steps when the detector controls the oscillator OSC to change the frequency of the oscillation signal (i.e. from the oscillation frequency F1 to the oscillation frequency F4, as shown in FIG. 5). That is, because the frequency of the free-running oscillator of the microwave motion sensor 10 is unable to be controlled precisely, the oscillator OSC could repetitively change the frequency by a predetermined frequency step, or with a set of predetermined frequency steps until no interference signal is detected.

Figure 9:
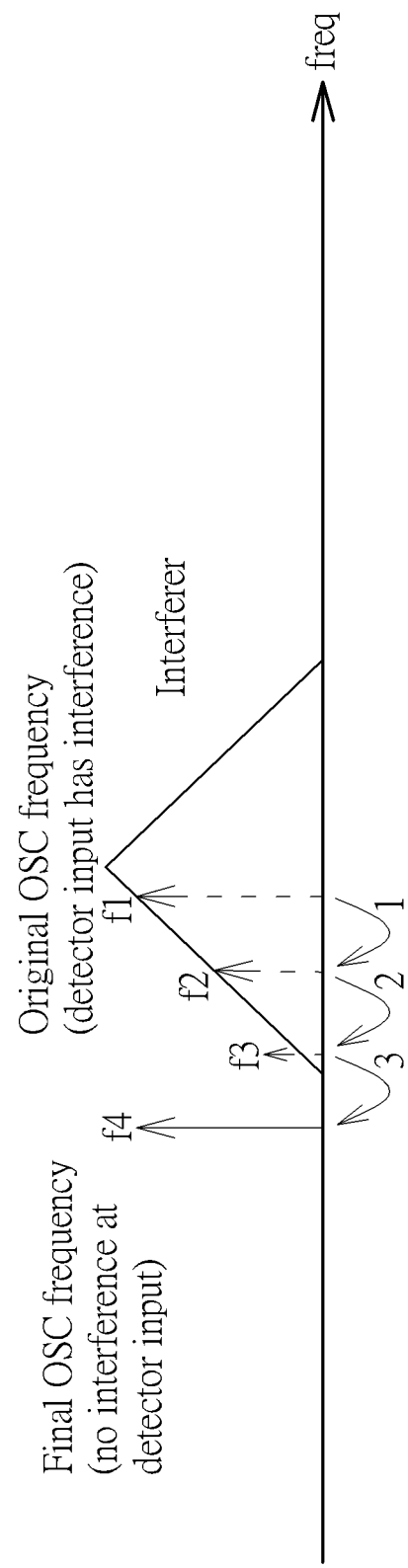
FIGS. 9-12 are schematic diagrams of adaptive frequency control according to an embodiment of the present disclosure.

For practical application of adaptive frequency control, reference is made to FIGS. 9-12. In FIG. 9, the oscillator OSC as the free-running oscillator decreases the oscillation frequency by one predetermined frequency step. That is, the oscillator OSC changes the oscillation frequency by shifting a predetermined frequency. For example, the oscillation frequency is changed from the frequency f1 to the frequency f2, and then the detector determines whether any interference occurs in the frequency f2 (i.e. by comparing the strength of the mixing signal with the predetermined threshold as abovementioned). If no interference signal is detected in the frequency f2 by the detector, the detector switches the microwave motion sensor 10 from the detection mode to the normal mode for detecting object motion in the frequency f2. On the other hand, if interference occurs at the frequency f2, the detector controls the oscillator OSC to change the oscillation frequency from the frequency f2 to the frequency f3 by the predetermined frequency, and then performs interference detection again. In other words, the microwave motion sensor 10 repeats the oscillation frequency shifting operation until no interference occurs at the oscillation frequency.

Figure 10:
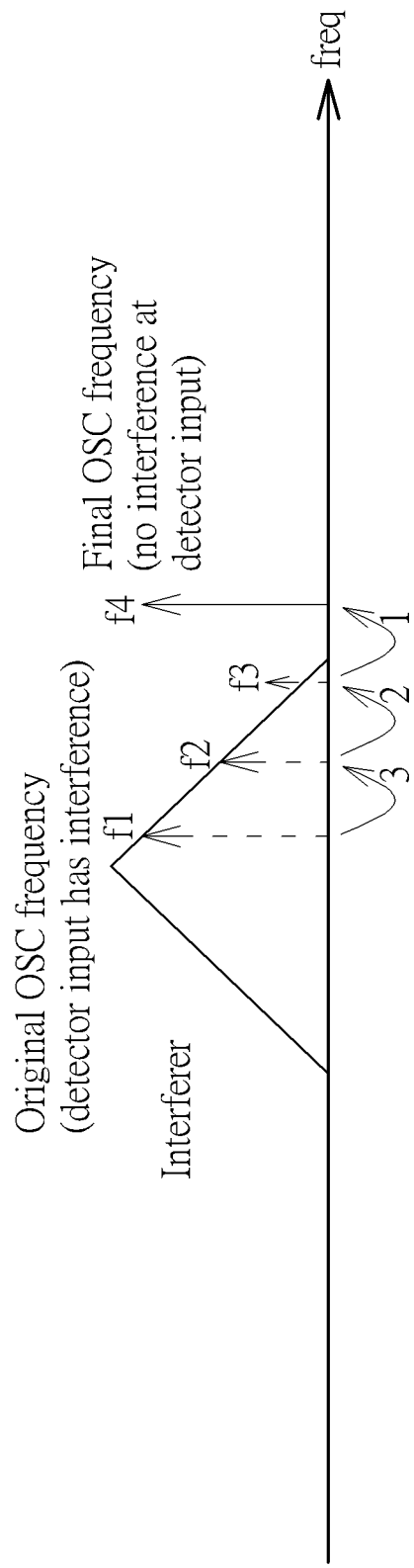

In FIG. 10, the oscillator OSC increases the oscillation frequency by one predetermined frequency step. That is, the oscillator OSC changes the oscillation frequency by shifting the predetermined frequency, and thus the oscillation frequency is changed from the frequency f1 to the frequency f2, change to the frequency f3 if interference occurs at the frequency f2, and so on.

Figure 11:
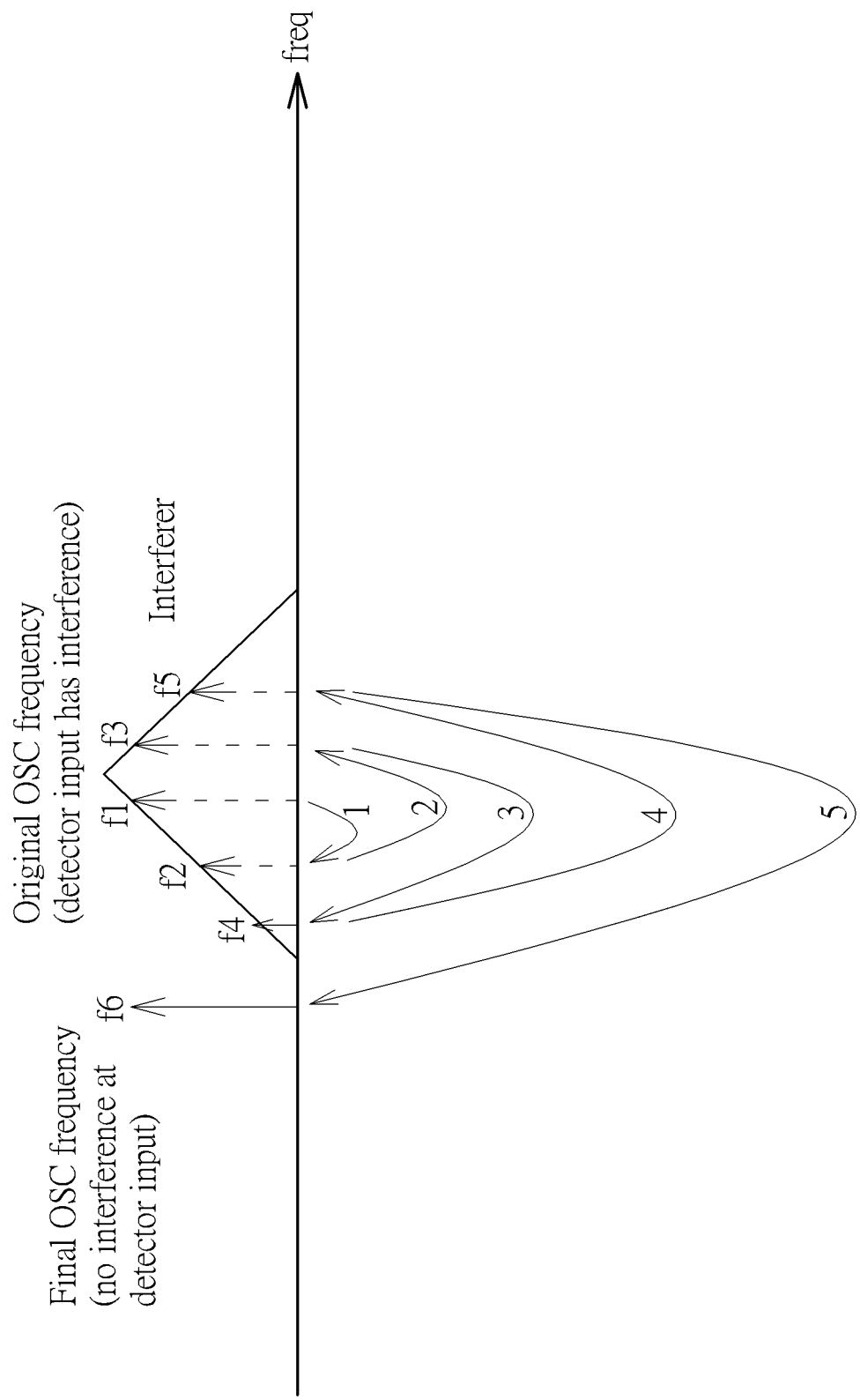
Figure 12:
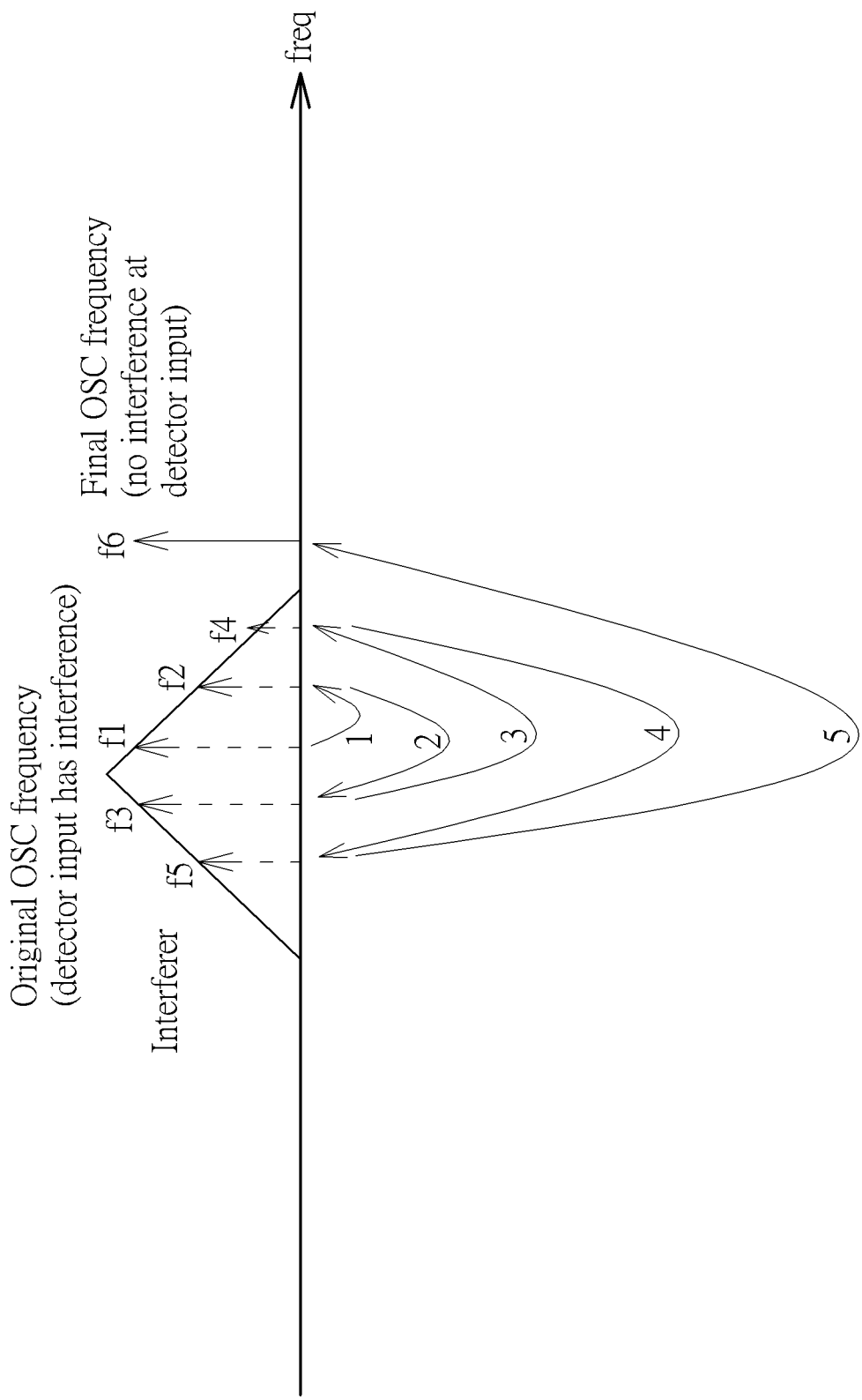

In FIG. 11, the oscillator OSC changes the oscillation frequency by a set of predetermined frequency steps. For example, the oscillator OSC decreases the oscillation frequency from the frequency f1 to the frequency f2 (i.e. by decreasing with one predetermined frequency), and then increases the oscillation frequency from the frequency f2 to the frequency f3 (i.e. by increasing with twice of the predetermined frequency), and so on. Similarly, as shown in FIG. 12, the oscillator OSC increases the oscillation frequency from the frequency f1 to the frequency f2 (i.e. by increasing with one predetermined frequency), and then decreases the oscillation frequency from the frequency f2 to the frequency f3 (i.e. by decreasing with twice of the predetermined frequency), and so on. That is, the microwave motion sensor 10 repeats the oscillation frequency shifting operation until no interference occurs at the oscillation frequency according to FIGS. 9-12, so as to reduce false alarm due to unwanted interference more effectively.

Figure 13:
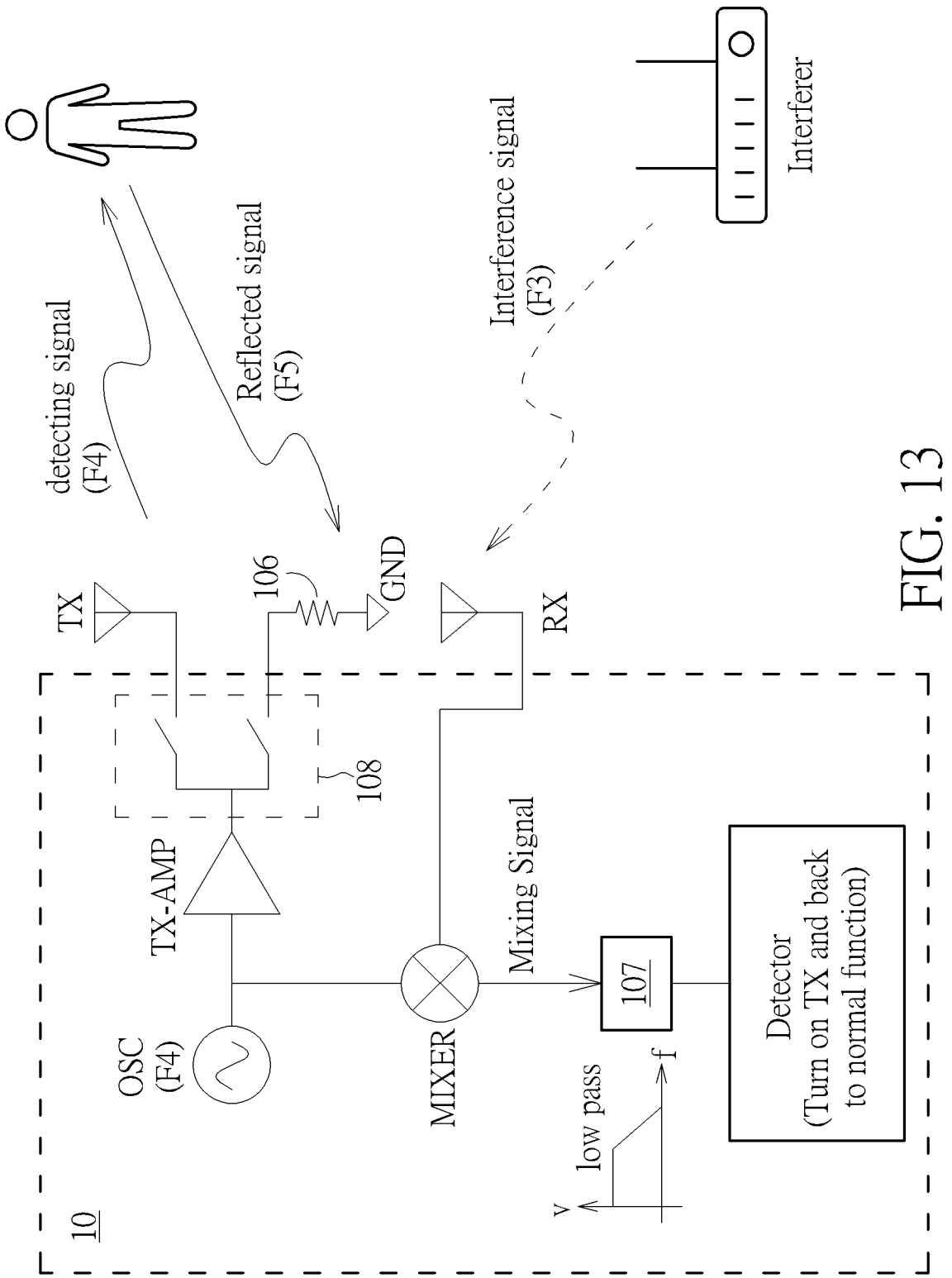
FIG. 13 is a schematic diagram of a microwave motion sensor according to an embodiment of the present disclosure.

FIG. 13 illustrates an example of a microwave motion sensor. In FIG. 13, a low pass filter 107 is coupled to the mixer and the detector, for filtering the mixing signal with a predefined cutoff frequency, so as to avoid an interference signal whose frequency is out of range. In addition, for realizing transmission amplifier TX-AMP switched to the suppression mode or object motion detecting function of the microwave motion sensor 10 being disable, a switch 108 is coupled to the transmission amplifier TX-AMP, for switching the transmission amplifier TX-AMP to the amplification mode (i.e. connecting to the transmitter TX) to output the detecting signal in the normal mode, and switching the transmission amplifier TX-AMP to the suppression mode (i.e. connecting to the ground GND through a resistor 106) to not output the detecting signal in the detection mode as shown in FIG. 13.

Figure 14:
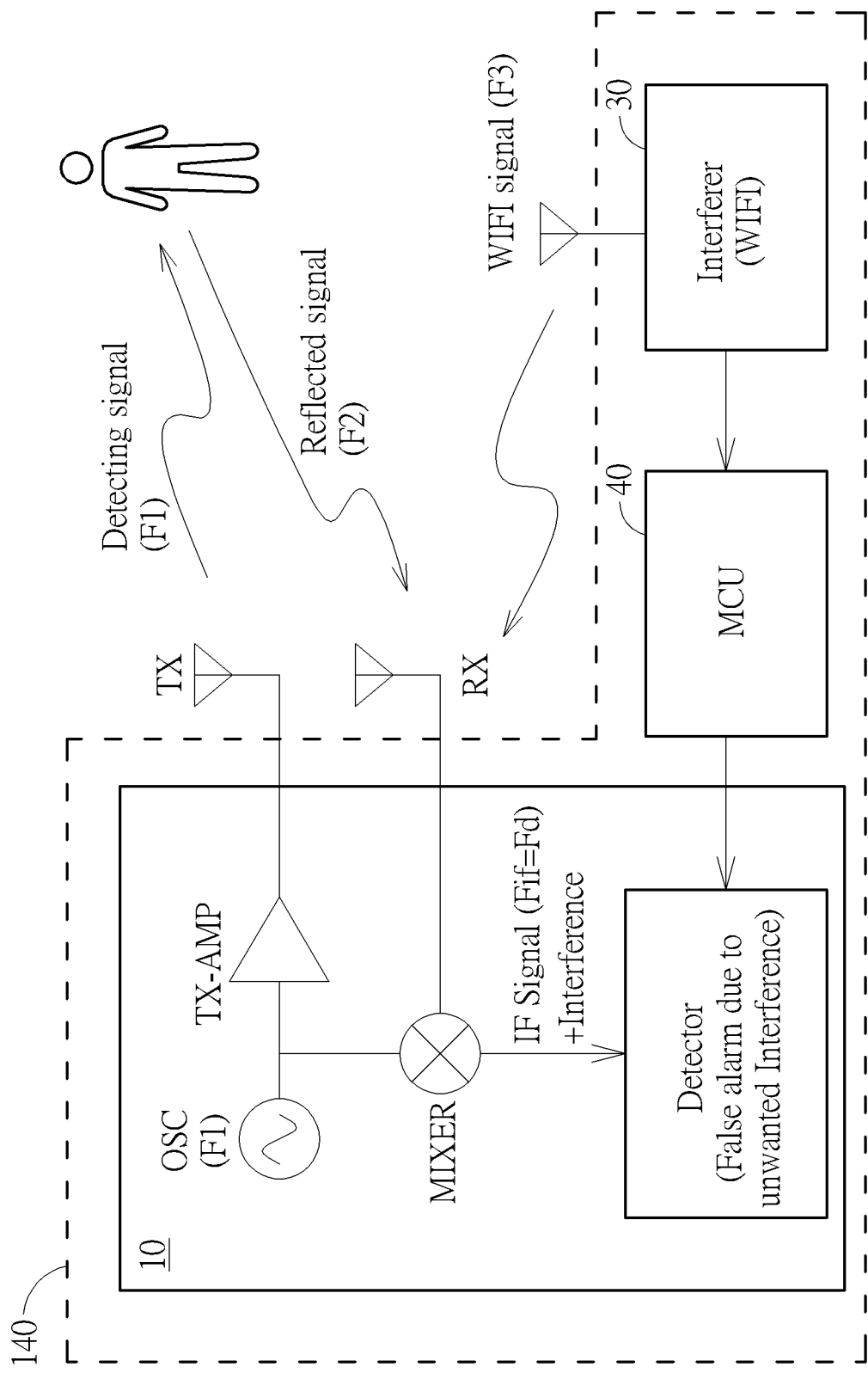
FIG. 14 is a schematic diagram of an electronic device according to an embodiment of the present disclosure.

Reference is made to FIG. 14, which is a schematic diagram of the electronic device 140 according to an embodiment of the present disclosure. The electronic device 140 includes the microwave motion sensor 10, the interferer 30 (e.g. a WIFI router), and a controller 40 (e.g. a MCU in this article). Note that, the controller 40 is configured for frequency control for the microwave motion sensor 10. In detail, the controller 40 is capable of obtaining a radio channel occupied by the interferer 30 is at a high frequency side or a low frequency side, and thus is able to control the microwave motion sensor 10 (e.g. by the detector) to decrease the frequency of the microwave motion sensor 10 operated at if the radio channel occupied by the interferer 30 is at a high frequency side, or to increase the frequency of the radio channel if the radio channel occupied by the interferer 30 is at a low frequency side. That is, the microwave motion sensor 10 changes the oscillation frequency to reduce false alarm due to unwanted interference more effectively.

Figure 15:
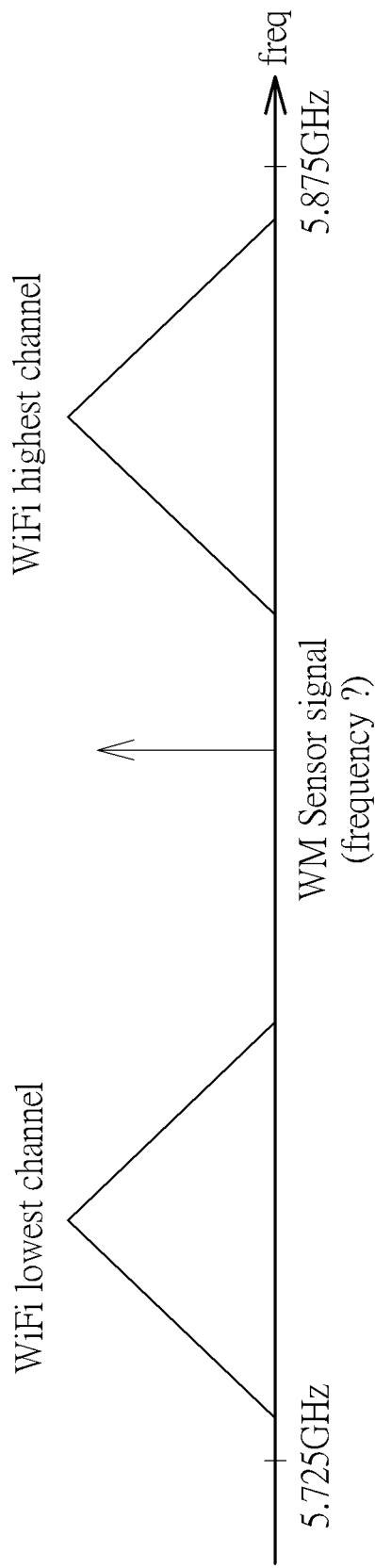
FIGS. 15-16 are schematic diagrams of an operation of an electronic device according to an embodiment of the present disclosure.
Figure 16:
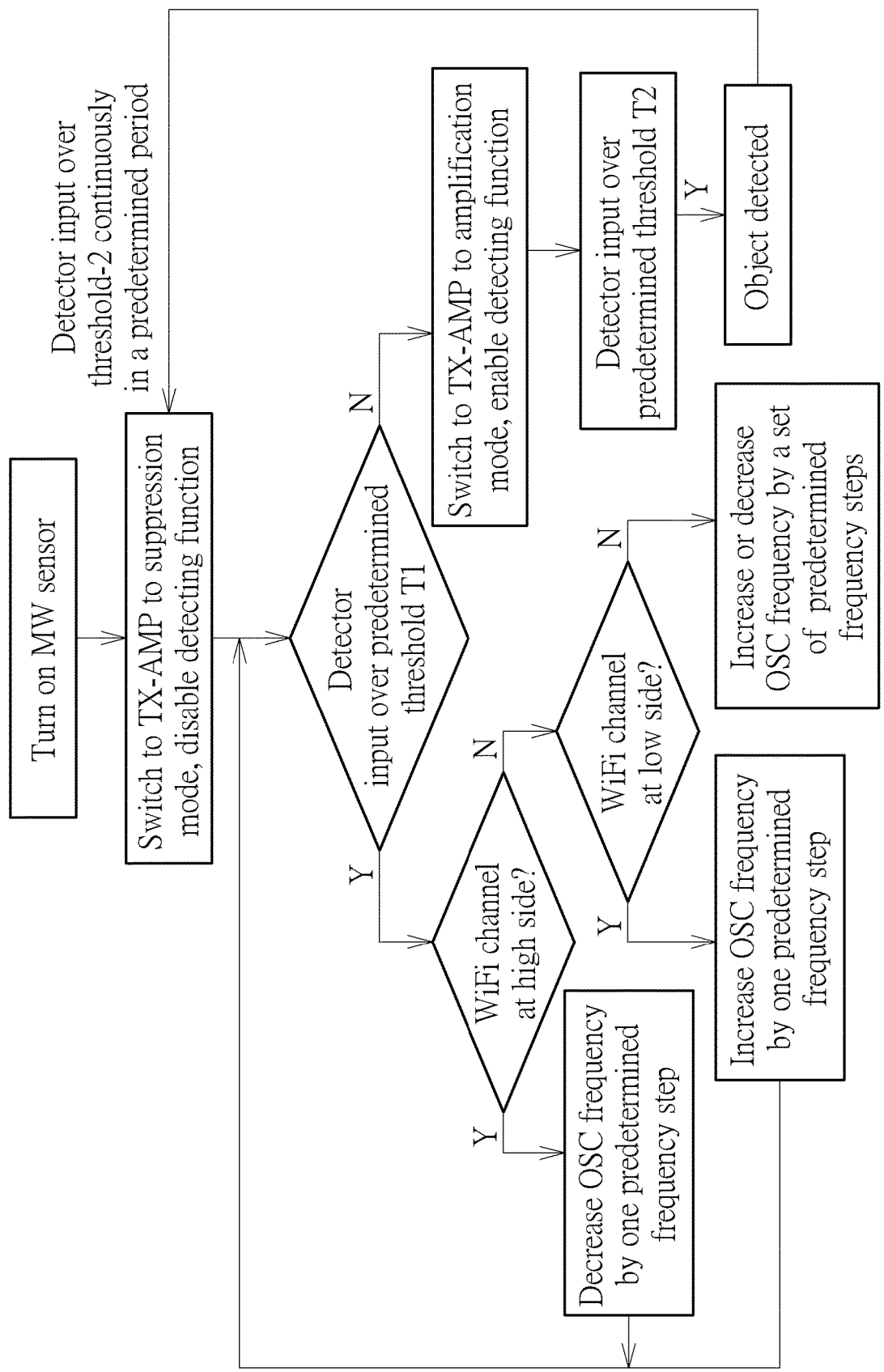

For detailed operation, the controller 40 of the electronic device 140 may not know the frequency of the microwave motion sensor 10 operated at since it is working with the free-running oscillator OSC, but knows which WIFI channel is applied with. Reference is made to FIG. 15. In FIG. 15, WIFI lowest channel is 5.725 GHz and WIFI highest channel is 5.875 GHz. As a result, the oscillator OSC shall not shift the oscillation frequency less than WIFI lowest channel (e.g. 5.725 GHz) and over the WIFI highest channel (e.g. 5.875 GHz). Moreover, as shown in FIG. 16, when the controller 40 determines that the interferer 30 is operated at high frequency side, the controller 40 controls the microwave motion sensor 10/oscillator OSC to decrease the oscillation frequency by one predetermined frequency step. When the controller 40 determines that the interferer 30 is not operated at high frequency side, the controller 40 further determines whether the interferer 30 is operated at low frequency side. If yes, the controller 40 controls the microwave motion sensor 10/oscillator OSC to increase the oscillation frequency by one predetermined frequency step. Otherwise, the controller 40 controls the microwave motion sensor 10/oscillator OSC to increase or decrease the oscillation frequency by a set of predetermined frequency steps. The detailed description for predetermined frequency shifting could be referred from above, so it is omitted herein.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the microwave motion sensor 10.

The present invention aims at providing a method of microwave motion detection with adaptive frequency control, to avoid false alarm due to interference. In detail, a detection mode for suppressing the output of the transmission amplifier is introduced in this article, so as to determine whether interference occurs more effectively. Thus, the microwave motion sensor can change the frequency of the detecting signal accordingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of microwave motion detection with adaptive frequency control, for a microwave motion sensor, the method comprising:

suppressing output of a first detecting signal for motion detection, wherein the first detecting signal is generated with a first frequency;

determining a first interference signal is detected in the first frequency during the suppressing output of the first detecting signal;

responsive to that the first interference signal is detected in the first frequency during the suppressing output of the first detecting signal, generating a second detecting signal with a second frequency, which is different from the first frequency, and suppressing output of the second detecting signal;

determining whether a second interference signal is detected in the second frequency during the suppressing output of the second detecting signal; and responsive to that the second interference signal is not detected in the second frequency, outputting the second detecting signal for motion detection;

determining a first signal as the first interference signal is received by the microwave motion sensor during the suppressing output of the first detecting signal;

wherein determining the first signal as the first interference signal is received by the microwave motion sensor during the suppressing output of the first detecting signal comprises:

performing a low pass filtering operation to a first mixing signal;

responsive to that a first mixing frequency of the first mixing signal is lower than a first cutoff frequency, determining the first signal is received by the microwave motion sensor, wherein the first mixing signal is generated according to the first detecting signal and the received first signal; and wherein determining whether the second interference signal is detected in the second frequency during the suppressing of the second detecting signal comprises:

determining whether a second signal as the second interference signal is received by the microwave motion sensor during the suppressing output of the second detecting signal;

performing the low pass filtering operation to a second mixing signal, wherein the second mixing signal is generated according to the second detecting signal and the received second signal;

responsive to that a second mixing frequency of the second mixing signal is lower than a second cutoff frequency, determining the second signal is received by the microwave motion sensor; and responsive to that the second mixing frequency of the second mixing signal is higher than the second cutoff frequency, determining the second signal is not received by the microwave motion sensor.

2. The method of claim 1,
wherein determining the first signal as the first interference signal is received by the microwave motion sensor during the suppressing output of the first detecting signal comprises:
responsive to that the first signal is received by the microwave motion sensor during the suppressing output of the first detecting signal and the strength of the first mixing signal is greater than the first threshold, determining the first interference signal is detected.

3. The method of claim 1, wherein suppressing output of the first detecting signal for motion detection comprises:
periodically stopping outputting the first detecting signal for motion detection; or
reducing an output power of the first detecting signal.

4. The method of claim 1, wherein responsive to that the first interference signal is detected in the first frequency during the suppressing output of the first detecting signal, generating the second detecting signal with the second frequency, which is different from the first frequency comprises:
generating the second detecting signal with the second frequency by decreasing or increasing the first frequency of the first detecting signal with a first frequency step, or with a first set of frequency steps;
wherein the method further comprises:
responsive to that the second interference signal is detected in the second frequency during the suppressing output of the second detecting signal, generating a third detecting signal with a third frequency, which is different from the first and second frequencies; and
generating the third detecting signal with the third frequency by decreasing or increasing the second frequency of the second detecting signal with a second frequency step or with a second set of frequency steps.

5. The method of claim 4, wherein generating the second detecting signal with the second frequency by decreasing or increasing the first frequency of the first detecting signal with the first frequency step, or with the first set of frequency steps, and generating the third detecting signal with the third frequency by decreasing or increasing the second frequency of the second detecting signal with the second frequency step or with the second set of frequency steps comprises:
generating the second detecting signal by decreasing the first frequency of the first detecting signal with a first frequency step, and generating the third detecting by increasing the second frequency of the second detecting signal with a second frequency step; or
generating the second detecting signal by increasing the first frequency of the first detecting signal with the first frequency step, and generating the third detecting by decreasing the second frequency of the second detecting signal with the second frequency step.

6. The method of claim 1, further comprising:
responsive to that the second interference signal is detected in the second frequency during the suppressing output of the second detecting signal, generating a third detecting signal with a third frequency, which is different from the first and second frequencies.

7. The method of claim 1, wherein determining whether the second interference signal is detected in the second frequency during the suppressing of the second detecting signal comprises:
determining whether a second signal as the second interference signal is received by the microwave motion sensor during the suppressing of the second detecting signal; and
responsive to that the second signal is not received by the microwave motion sensor during the suppressing of the second detecting signal, determining the second interference signal is not detected; or
responsive to that the second signal is received by the microwave motion sensor during the suppressing of the second detecting signal but a strength of a second mixing signal, which is generated according to the second detecting signal and the received second signal, is smaller than a second threshold, determining the second interference signal is not detected; or
responsive to that the second signal is received by the microwave motion sensor during the suppressing of the second detecting signal and the strength of the second mixing signal is greater than the second threshold, determining the second interference signal is detected.

8. The method of claim 1, wherein responsive to that the first interference signal is detected in the first frequency during the suppressing output of the first detecting signal, generating the second detecting signal with the second frequency, which is different from the first frequency comprises:
determining whether a radio channel occupied by an interferer is at a high frequency side or a low frequency side, wherein the first interference signal is caused by the interferer, and the first frequency of the first interference signal is within the radio channel;
responsive to that the radio channel occupied by the interferer is at a high frequency side, generating the second detecting signal with the second frequency by decreasing the first frequency of the first detecting signal with a first frequency step, or with a first set of frequency steps; and
responsive to that the radio channel occupied by the interferer is at a low frequency side, generating the second detecting signal with the second frequency by increasing the first frequency of the first detecting signal with a second frequency step, or with a second set of frequency steps.

9. The method of claim 8, wherein the interferer is a WI-FI device or another microwave motion sensor.

* * * * *